United States Patent
Brunner et al.

[11] Patent Number: 6,112,647
[45] Date of Patent: Sep. 5, 2000

[54] FOOD PROCESSING DEVICE WITH PLATEN PRESSURE CONTROL

[76] Inventors: Karl H. Brunner, 519 Mountainview Rd., Nazareth, Pa. 18064; Richard E. Hathaway, 8 Colonial Rd., Brookside, N.J. 07926

[21] Appl. No.: 09/302,025

[22] Filed: Apr. 29, 1999

Related U.S. Application Data

[60] Provisional application No. 60/083,614, Apr. 30, 1998.

[51] Int. Cl.[7] .............................. A21C 3/02; A21C 11/04; A21C 15/00; A23P 1/00
[52] U.S. Cl. .............................. 99/349; 99/353; 99/443 C
[58] Field of Search .................. 99/339, 340, 349–351, 99/352–355, 386, 443 R, 443 C, 427, 400, 401, 477; 100/151, 216, 168, 178, 172; 425/308, 310, 363, 367, 141, 142, 194, 202, 229, 294, 298; 426/389, 231, 502, 503, 517

[56] References Cited

U.S. PATENT DOCUMENTS

| | | |
|---|---|---|
| 3,646,879 | 3/1972 | Palmason et al. .................. 99/339 |
| 3,965,807 | 6/1976 | Baker .................................. 99/375 |
| 4,197,792 | 4/1980 | Mendoza ........................... 99/353 X |
| 4,530,276 | 7/1985 | Miller ................................. 99/386 |
| 4,938,126 | 7/1990 | Rubio et al. ..................... 100/151 X |
| 5,044,264 | 9/1991 | Forney .............................. 99/443 C |
| 5,388,503 | 2/1995 | Buerkle ............................. 100/178 |
| 5,458,051 | 10/1995 | Alden et al. ...................... 99/423 X |
| 5,588,354 | 12/1996 | Stuck et al. ...................... 99/477 X |
| 5,722,315 | 3/1998 | Naramura .......................... 99/349 |
| 5,918,533 | 7/1999 | Lawrence et al. ................ 99/353 X |

Primary Examiner—Timothy Simone
Attorney, Agent, or Firm—Patent Smart P.L.L.P.; Thomas G. Raffin

[57] ABSTRACT

A high speed food processing machine providing an improved platen mechanism wherein the device produces more uniform platen pressure across the platens by having multiple hydraulically operated pressure points on the upper platen. The food processing machine is capable of having two belts; one around each platen, to provide more uniform pressure. This uniform pressure allows better heater placement and control. This invention also provides a method of cooling across the platens and removeably attaching the moving belt(s) to the moving platens. An energy storing mechanism assists in the platen movement.

10 Claims, 3 Drawing Sheets

FOOD PROCESSING DEVICE WITH PLATEN PRESSURE CONTROL

This application claims benefit of Provisional Application Ser. No. 60/083,614, filed Apr. 30, 1998.

BACKGROUND OF THE INVENTION

1. Field of the Invention

The present invention relates to food processing machines generally and more particularly to a high speed food processing device using a pair of opposing platens to mold and flatten the food product where the pressure is applied by the upper platen is distributed at the corners of the platen to more uniformly mold and flatten the food product.

2. Description of the Prior Art

Food processing devices in the prior art, such as those disclosed in U.S. Pat. Nos. 4,938,126 and 5,388,503 utilize a centrally disposed piston to lower and raise the upper platen with respect to the lower platen. The use of a centrally applied force may result in uneven distribution of pressure across the surface of the upper platen. Therefore, the food products being molded and flattened are often uneven and not uniform in appearance.

SUMMARY OF THE INVENTION

The problem described above has been addressed by the present invention, which relates to a food processing device and, more particularly, to a high speed food processing device using a pair of opposing platens to mold and flatten the food product where the pressure applied by the upper platen is distributed at the corners of the platen to more uniformly mold and flatten the food product.

The general purpose and object of the present invention, which will be described subsequently in great detail, is to provide a food processing device with platen pressure control which has the advantages mentioned heretofore and novel features that result in a new food processing device.

To attain this, the present invention generally comprises two platens, one upper and one lower, wherein the upper platen is moved by hydraulically operated pistons acting on each corner of the platen. This, in turn, allow the center of the upper platen to have better heat distribution, and having a belt operating around said upper platen.

A further object of the invention is to have a machine where the upper and lower platens move back and forth together to form a continuous mode of operation.

It is another object of the invention to provide a food processing machine where the belts in the machine are segmented.

It is another object of the present invention to provide a food processing machine where the segmented belts are attached to the platens for coupling the movements of the platens to the belts.

It is a further object of the invention to include an air stream over the surface of the platens to assist in the transfer of dough.

The final object of the invention is to provide a means of storage of mechanical energy to assist in the movement of the platens.

BRIEF DESCRIPTION OF THE DRAWINGS

This invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
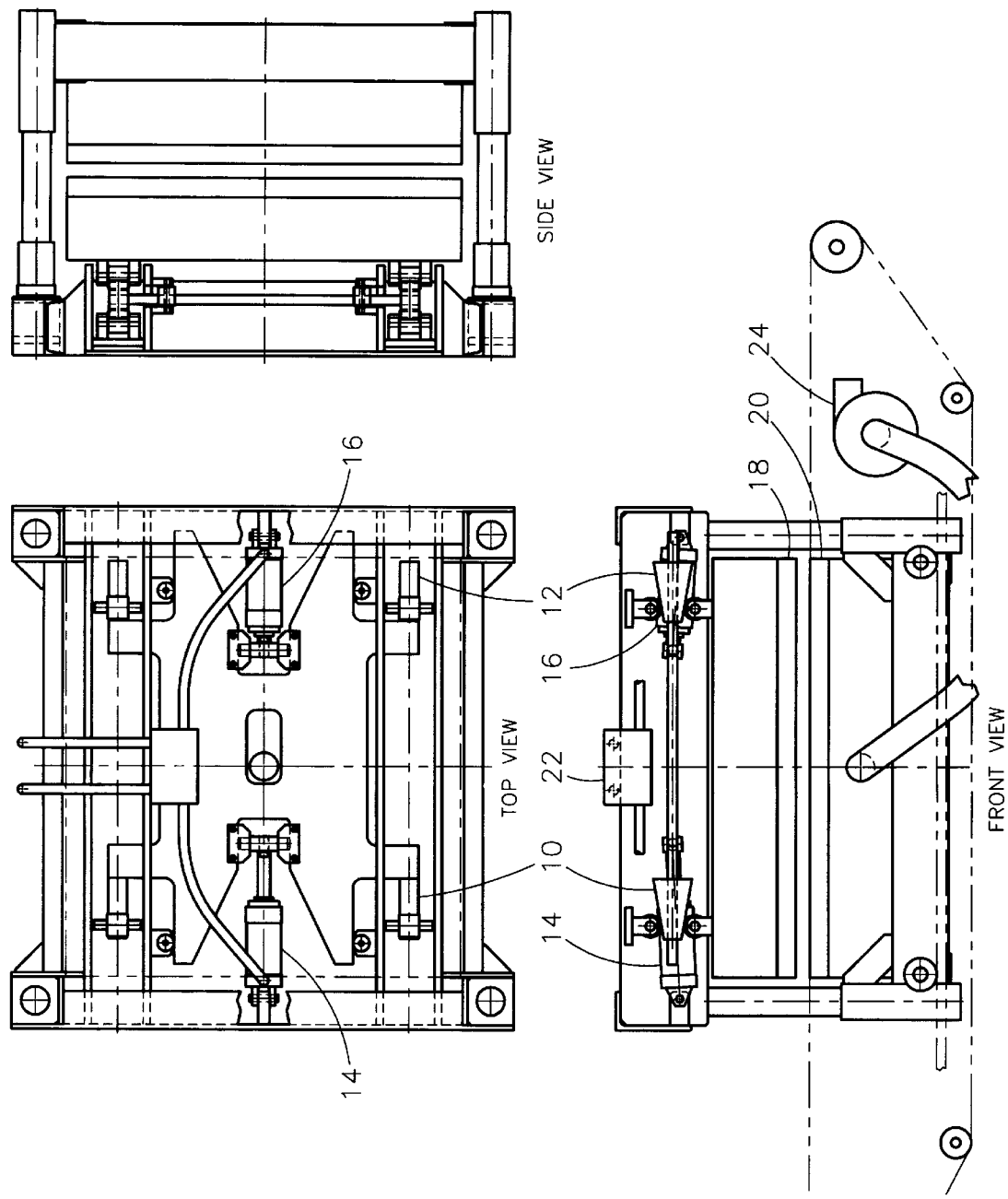
FIG. 1 is a side elevation of a new Food Processing Device With Platen Pressure Control according to the present invention.

The problem described above has been addressed by the present invention, which relates to a food processing device and, more particularly, to a high speed food processing device using a pair of opposing platens to mold and flatten the food product where the pressure applied by the upper platen is distributed at the corners of the platen to more uniformly mold and flatten the food product.

A hydraulic system utilizing a set of platens and wedges disposed at each corner of the upward platen are used to lower the upper platen toward the lower platen by applying an equal force against each corner of the upper platen. A side view of an exemplary food processing device is illustrated in FIG. 1, showing in particular a pair of wedges 10, 12 and associated pistons 14, 16 used to lower upper platen 18 to press against the food product resting on lower platen 20.

Advantageously, the pressure-controlled food processing system can be used with either a continuous feed processing arrangement (requiring the press to roll back and forth on a carriage arrangement) or a more traditional stationary arrangement. In general, the arrangement of the present invention displays an improvement over the prior art in that when operated in a continuous mode, the press (comprising platens 18 and 20) cycles without stopping.

A centrally disposed hydraulic system 22 is in communication with each of the four pistons (that is, pistons 14, 16 as shown in FIG. 1, as well as the remaining pair of pistons at the other corners of upper platen 18. The use of the spatially disparate control arrangement of the present invention may also be used to provide for a spatially disparate heating arrangement for the upper platen 18, since there are many circumstances where the food product must be heated as it travels through the processing device. Thus, the use of the inventive heating means allows for more even heat distribution than the centrally disposed arrangement of the prior art. A blower unit 24 may be coupled to the food processing device of the present invention and is disposed so as to provide a stream of cooled air over the surface of upper platen 18 and lower platen 20 at the end of the molding cycle. Advantageously, the stream of cooled air assists in transferring the molded food products from lower platen 20, as well as to cool the surface temperature of platens 18 and 20 prior to the next molding and heating cycle.

Figure 2:
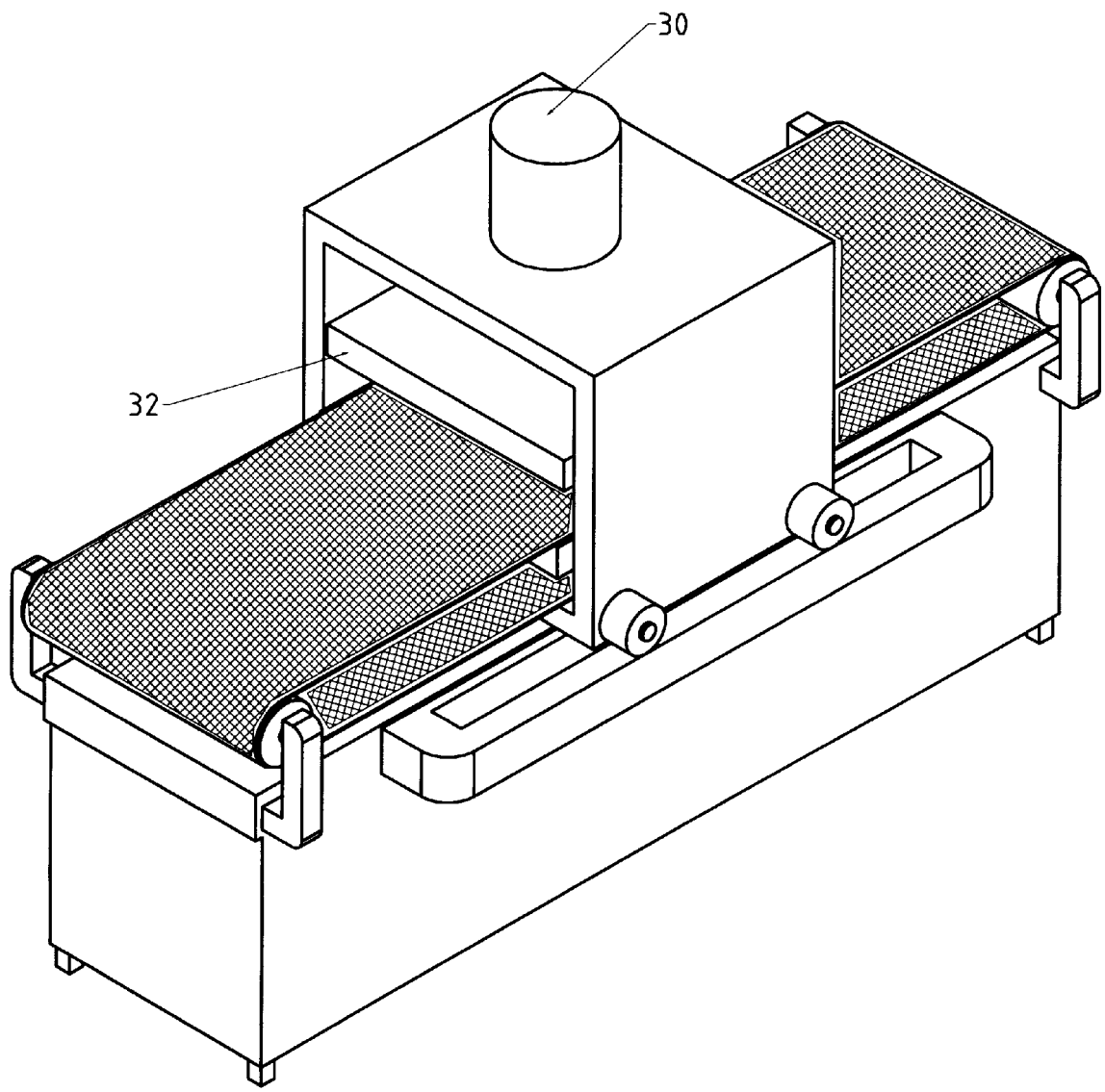
FIG. 2 is an isometric view of the prior art.
Figure 3:
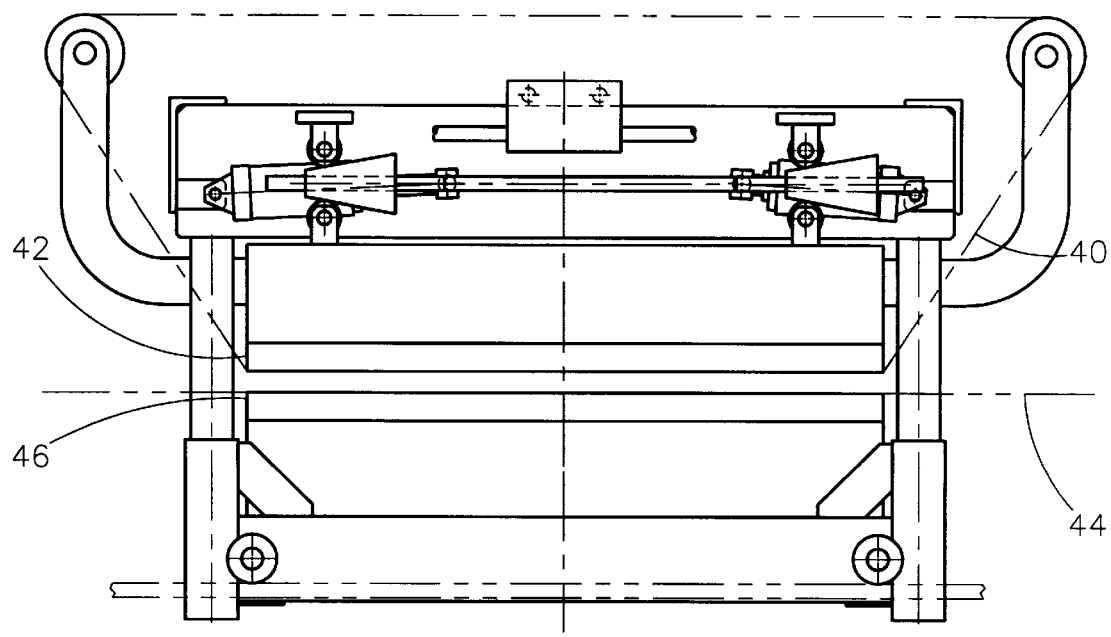
FIG. 3 is a side elevation of a Food Processing Device With Platen Pressure Control showing the use of a top belt circulating around the top platen.
Figure 4:
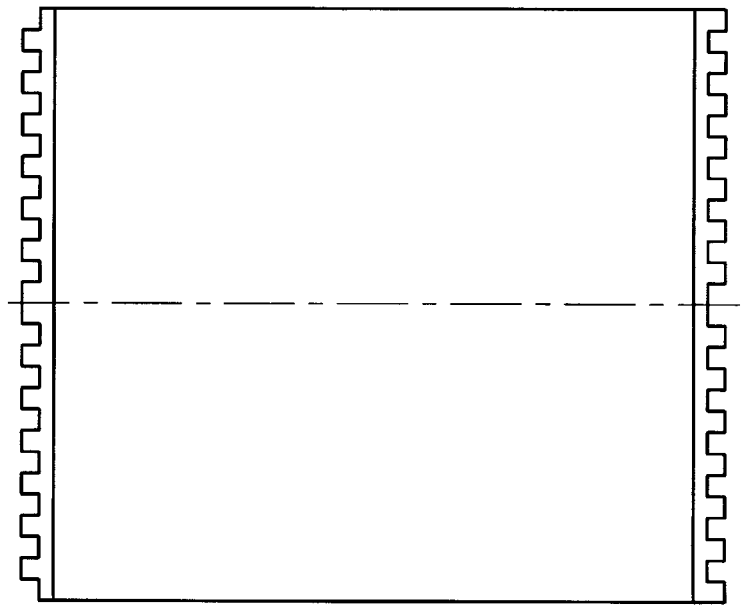
FIG. 4 is a plan view of a segmented belt section displaying the connecting means at both ends of the belt.

In conventional systems, such as shown in FIG. 2, the centrally disposed piston 30 for controlling the lower of upper platen 32 exits through the top surface of the food processing device. In contrast, the pressure-controlled system of the present invention, as shown in FIG. 1, is contained within an apparatus having a relatively low profile, since the system of hydraulics and wedges is used to simultaneously apply a pressure to each corner of the upper platen. Another feature of the present invention, therefore, is that the remove of a central piston allows for an upper belt 40 to be incorporated with the processing device. This arrangement is illustrated in FIG. 3. The ability to add an upper belt 40 to circulate around an upper platen 42 (In addition to the conventional lower belt 44 traveling around lower platen 46) further increases the uniformity of the food being processed. In particular, the food product is initially "grabbed" between belts 40 and 44 so as to be molded and pressed between the belts, resulting in a uniformly pressed product exiting the processing device. A segmented belt, as shown in FIG. 4, may be installed and used as upper belt 40 and lower belt 44. A segmented belt, comprising a plurality of separate, joinable sections, allows for easier maintenance and replacement, since the entire belt need not be removed from the machine. In a preferred embodiment, operating in a continuous mode, the segmented belt may be linked to the drive mechanism for the movement of the upper and lower platens.

Other and further advantages of the invention will be obvious to those skilled in the art and are defined by the claims appended hereto.

What is claimed is:

1. A food processing machine for compressing dough, the machine comprising an upper platen defined as including a relatively flat pressing surface;

a lower platen defined as including a relatively flat pressing surface and positioned underneath said upper platen such that the pressing surfaces face each other;

a conveyor belt disposed to travel across the lower platen and carry dough into a pressing area; and pressure control means coupled to the upper platen for applying a uniform force against a plurality of distributed locations of the lower platen as said upper platen approaches said lower platen.

2. A food processing machine as defined in claim 1 wherein the upper and lower platens move back forth to form a continuous mode of operation.

3. A food processing machine as defined in claim 1 wherein the upper and lower platens are stationary.

4. A food processing machine as defined in claim 1 wherein the pressure control means comprises a plurality of pistons and associated wedges, controlled by a single hydraulic means for simultaneously applying an essentially equal pressure to a plurality of separate locations of the upper platen and lowering said upper platen toward the lower platen.

5. A food processing machine as defined in claim 1 wherein the machine further comprises an upper conveyor belt disposed to circulate around the upper platen and assist in moving dough through the machine.

6. A food processing machine as defined in claim 5 wherein each conveyor belt comprises a segmented belt formed of a plurality of separate sections that are removably joined.

7. A food processing machine as defined in claim 6 wherein the segmented belt includes an attachment means for coupling the movement of said segmented belt to the movement of the platens.

8. A food processing machine as defined in claim 1 wherein the machine further comprises heating means of the upper and lower platens for providing an essentially uniform heating of said platen surfaces.

9. A food processing machine as defined in claim 1 wherein the machine further comprises an air movement means disposed to provide an air stream over the surface of the upper and lower platens and assist transfer of dough through the press.

10. A food processing machine as defined in claim 1 wherein the machine comprises means capable of storing and returning mechanical energy used to provide movement of the platens.

* * * * *